United States Patent
Gagnon et al.

(10) Patent No.: US 6,718,998 B2
(45) Date of Patent: Apr. 13, 2004

(54) APPARATUS AND METHOD FOR DISSIPATING HEAT IN A STEAM PRESSURE REGULATOR FOR A FUEL CELL SYSTEM

(75) Inventors: Frederic Gagnon, Chatham (CA); Gary Everingham, Chatham (CA)

(73) Assignee: Siemens VDO Automotive, Incorporated (CA)

( * ) Notice: Subject to any disclaimer, the term of this patent is extended or adjusted under 35 U.S.C. 154(b) by 35 days.

(21) Appl. No.: 10/102,955

(22) Filed: Mar. 22, 2002

(65) Prior Publication Data

US 2003/0178063 A1 Sep. 25, 2003

(51) Int. Cl.[7] .............................. F16K 49/00; F17D 1/18
(52) U.S. Cl. ........................ 137/14; 137/338; 137/494
(58) Field of Search ................................ 137/338, 494, 137/14

(56) References Cited

U.S. PATENT DOCUMENTS

| | | | |
|---|---|---|---|
| 2,254,472 A | * 9/1941 | Dahl | 137/338 |
| 2,258,595 A | * 10/1941 | Butler | 137/338 |
| 2,981,278 A | 4/1961 | Bergson | 137/340 |
| 3,253,611 A | * 5/1966 | Cummins | 137/494 |
| 3,542,004 A | 11/1970 | Cornelius | 123/119 |
| 3,720,227 A | * 3/1973 | Curran | 137/339 |
| 3,762,384 A | 10/1973 | Day et al. | 123/119 |
| 3,783,848 A | 1/1974 | Ranft et al. | 123/119 |
| 3,799,131 A | 3/1974 | Bolton | 123/119 |
| 3,802,402 A | 4/1974 | Swatman | 123/119 |
| 3,982,515 A | 9/1976 | Bradshaw | 123/119 |
| 4,069,798 A | 1/1978 | Thornburgh | 123/119 |
| 4,116,182 A | 9/1978 | Bradshaw | 123/119 |
| 4,161,188 A | 7/1979 | Jorgensen | 137/386 |
| 4,180,034 A | 12/1979 | Vogelsberg | 123/119 |
| 4,205,644 A | 6/1980 | Treadwell et al. | 123/119 |
| 4,285,317 A | 8/1981 | Takahara et al. | 123/568 |
| 4,364,368 A | 12/1982 | Blanchette | 123/568 |
| 5,163,295 A | 11/1992 | Bradshaw | 60/605.2 |
| 5,163,471 A | * 11/1992 | Powell | 137/494 |

* cited by examiner

Primary Examiner—A. Michael Chambers

(57) ABSTRACT

An apparatus and method for dissipating heat from a steam pressure regulator for a reformer of a fuel cell system. The reformer including an inlet in fluid communication with a steam source, and an outlet providing a supply of hydrogen gas. The steam pressure regulator including a valve body, a valve movable between first and second positions, an actuator, and an intermediate body. The valve body defines an internal flow passage between first and second ports. The first port is adapted to be in fluid communication with the inlet of the reformer. The first position of the valve substantially prevents fluid communication through the internal flow passage, and the second position of the valve permits generally unrestricted fluid communication through the internal flow passage. The actuator includes an actuator body that defines a chamber, a movable actuator wall that divides the chamber into first and second chamber spaces, and a shaft that couples the movable actuator wall to the valve. The intermediate body couples the valve body with respect to the actuator body, and includes a fin projecting into ambient conditions around the intermediate body.

16 Claims, 3 Drawing Sheets

APPARATUS AND METHOD FOR DISSIPATING HEAT IN A STEAM PRESSURE REGULATOR FOR A FUEL CELL SYSTEM

FIELD OF THE INVENTION

This disclosure relates to a steam pressure regulator, and more particularly, to a steam pressure regulator for use in a fuel cell system.

BACKGROUND OF THE INVENTION

It is believed that a fuel cell includes two electrodes sandwiched around an electrolyte. It is believed that oxygen, e.g., from air, passes over one electrode and hydrogen, e.g., from a hydrogen source, passes over the other electrode, and in a chemical reaction, generates electricity.

It is also believed that the hydrogen source can be a reformer that produces hydrogen gas as one product of another chemical reaction. It is believed that one type of reformer uses steam, oxygen, and gasoline to produce hydrogen, carbon dioxide, and carbon monoxide. Thus, it is believed that there is a need to regulate the steam pressure supplied to a reformer in a fuel cell system.

SUMMARY OF THE INVENTION

The present invention provides a steam pressure regulator for a reformer of a fuel cell system. The reformer including an inlet in fluid communication with a steam source, and an outlet providing a supply of hydrogen gas. The steam pressure regulator including a valve body, a valve movable between first and second positions, an actuator, and an intermediate body. The valve body defines an internal flow passage between first and second ports. The first port is adapted to be in fluid communication with the inlet of the reformer. The first position of the valve substantially prevents fluid communication through the internal flow passage, and the second position of the valve permits generally unrestricted fluid communication through the internal flow passage. The actuator includes an actuator body that defines a chamber, a movable actuator wall that divides the chamber into first and second chamber spaces, and a shaft that couples the movable actuator wall to the valve. The intermediate body couples the valve body with respect to the actuator body, and includes a fin projecting into ambient conditions around the intermediate body.

The present invention also provides a method of dissipating heat from a steam pressure regulator. The steam pressure regulator includes a valve body, a valve, and an actuator. The valve body defines an internal flow passage between a first port and a second port. The valve is movable between a first position that substantially prevents fluid communication through the internal flow passage and a second position that permits generally unrestricted fluid communication through the internal flow passage. The actuator includes an actuator body that defines a chamber, a movable actuator wall that divides the chamber into first and second chamber spaces, and a shaft that couples the movable actuator wall to the valve. The method includes providing an intermediate body coupling the valve body to the actuator body and the intermediate body includes a fin projecting into ambient conditions around the intermediate body, and dissipating from the fin into the ambient conditions heat that would otherwise be conducted from the valve body to the actuator.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
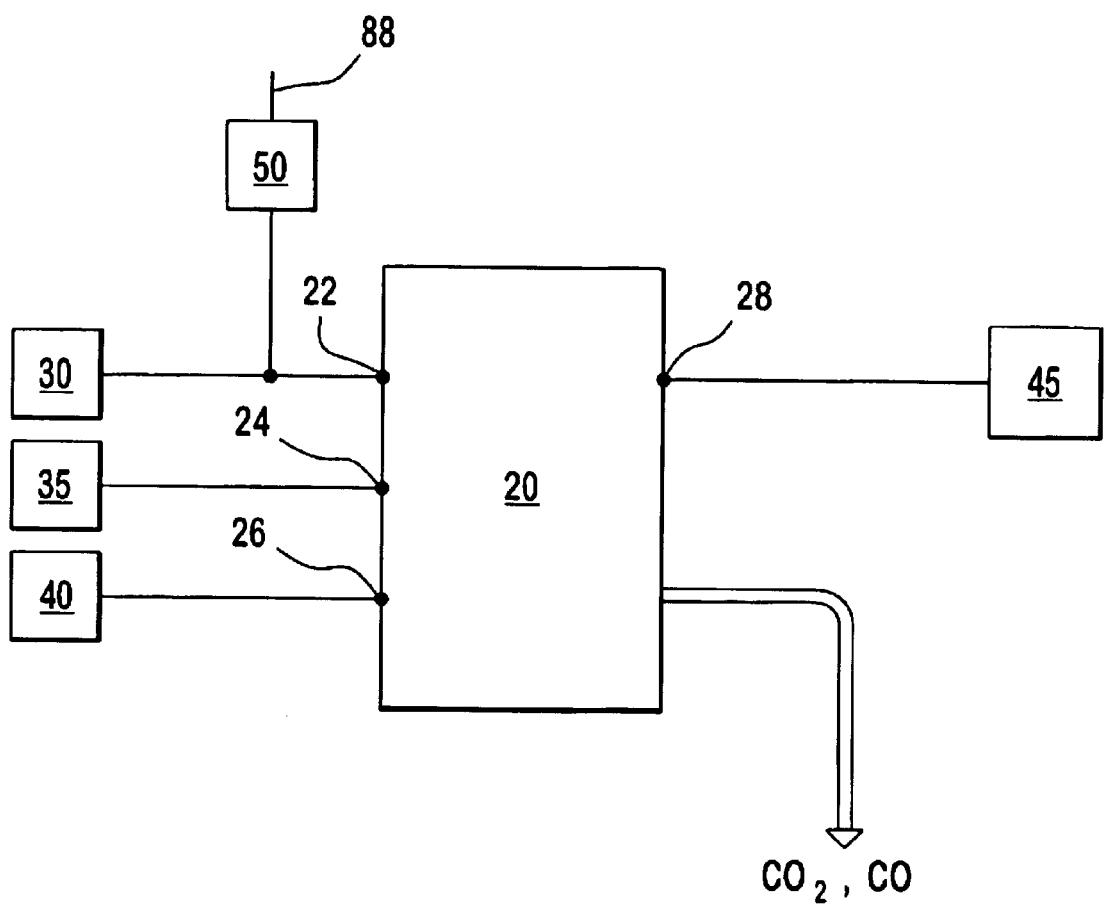
FIG. 1 is a schematic illustration of a system, in accordance with the present invention, including a fuel cell and a pressure regulator.

Referring to FIG. 1, there is shown a system 10 according to the present invention. As used herein, like numerals indicate like elements throughout. The system 10 includes a reformer 20, a source of steam 30, a source of oxygen 35, a source of gasoline 40, a fuel cell 45, and a pressure regulator 50. The reformer 20 can include a first inlet 22 in fluid communication with the steam source 30, a second inlet 24 in fluid communication with the oxygen source 35, and a third outlet 28 in fluid communication with the gasoline source 40. The reformer 20 can also include an outlet 28 from which hydrogen gas is supplied to the fuel cell 45. In the fuel cell 45, a chemical reaction using the hydrogen generates electrical energy, as is known.

Figure 2:
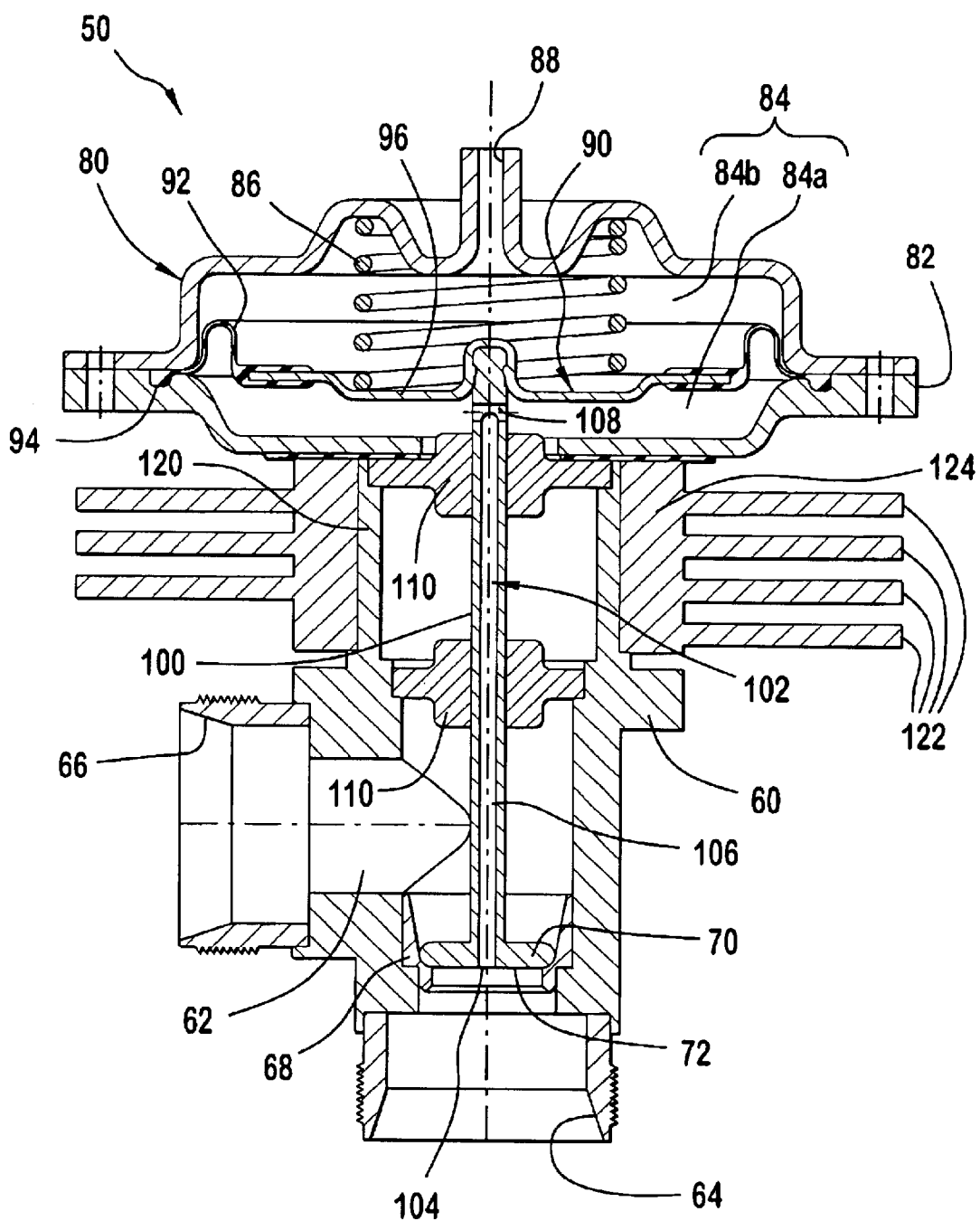
FIG. 2 is a cross sectional view of the pressure regulator in accordance with the present invention.

Referring also to FIG. 2, the pressure regulator 50 is coupled for steam communication to the first inlet 22 of the reformer 20. According to a preferred embodiment, the pressure regulator 50 branches off a steam line coupling the steam source 30 and the first inlet 22 of the reformer 20. The pressure regulator 50 includes a valve body 60 defining an internal flow passage 62 between an inlet port 64 and an outlet port 66. The internal flow passage 62 can be at least partially defined by a valve seat 68 fixed to the valve body 60. The inlet port 64 is coupled for fluid communication with the outlet 28 of the fuel cell 20, and the outlet port 66 is coupled for fluid communication with the ambient environment. Of course, fluid communication can be achieved through any know types of passages, conduits, pipes, etc., or their equivalents. According to the preferred embodiment illustrated in FIG. 2, the inlet and outlet ports 64, 66 are oriented at 90 degrees with respect to one another. Of course, other relative orientations, e.g., in-line, are also possible. The valve body 60 can be constructed of metal, plastic, or an equivalent material that does not react adversely to contact with steam.

A valve 70 is movable with respect to the valve body 60 so as to control fluid communication through the internal flow passage 62. The valve 70 can be a poppet that is displaceable with respect to the valve seat 68 between first and second positions. In the first position of the valve 70 with respect to the valve seat 68, as shown in FIG. 2, fluid communication through the internal flow passage 62 is substantially preventing by virtue of the valve 70 sealingly engaging the valve seat 68. In the second position of the fluid of the valve 70 with respect to the valve seat 68, not shown, fluid communication through the internal flow passage 62 is generally unrestricted by virtue of the valve 70 being spaced from the valve seat 68. The valve 70 can be constructed of metal, plastic, or an equivalent material that does not react adversely to contact with steam.

An actuator 80 can be used to control movement of the valve 70 between the first and second positions. The actuator 80 can include an actuator body 82 defining a chamber 84, a movable actuator wall 90 dividing the chamber 84 into a first chamber space 84a and a second chamber space 84b, and a shaft 100 coupling the movable actuator wall 90 to the valve 70. The actuator body 82 can be constructed of metal, plastic, or an equivalent material.

The first chamber space 84a is in fluid communication with the inlet port 64 such that changes in steam pressure at the inlet port 64 can vary the volume of the first chamber space 84a by displacing the movable actuator wall 90.

A resilient element, e.g., a coil spring 86, is located in the second chamber space 84b and extends between the actuator body 82 and the movable actuator wall 90. The coil spring 86 presents a spring force opposing the steam pressure expanding the volume of the first chamber space 84a. According to the preferred embodiment illustrated in FIG. 2, a vent port 88 can provide fluid communication between the second chamber space 84b and the ambient environment.

The movable actuator wall 90 can include a diaphragm 92 flexibly coupling an outer portion 94, which is sealed with respect to the actuator body 82, and an inner portion 96, which is fixed to the shaft 100. In a preferred embodiment, the movable actuator wall 90 is substantially fluid impermeable and the inner portion 96 includes a relatively rigid disk contiguously engaged by the spring 86. The diaphragm 92 can be constructed of rubber, a polymer, or an equivalent material that is sufficiently flexible to accommodate the relative movement of the inner and outer portions 94, 96.

According to the preferred embodiment illustrated in FIG. 2, the valve 70 and the shaft 100 define a signal passage 102 providing fluid communication between the inlet port 64 and the first chamber space 84a. The signal passage 102 can include a signal port 104 in a face 72 of the valve 70 (the face 70 is in fluid communication with the inlet port 64 in the first position of the valve 70), a longitudinal channel 106 extending along a longitudinal axis of the shaft 100, and a transverse channel 108 providing fluid communication between the longitudinal channel 106 and the first chamber space 84a.

One or more guides 110 can support the shaft 100 for longitudinal sliding with respect to the valve body 60. According to the preferred embodiment illustrated in FIG. 2, two guides 110, e.g., antifriction bearings, facilitate smooth movement of the shaft 100 relative to the valve body 60. Of course, any number of guides 110 can be used, and can be separately fitted to, or integrally formed with, the valve body 60. Additionally, a guide 110 (the upper guide 110 shown in FIG. 2) can provide a substantially fluid tight seal with respect to the shaft 100 and thus partially define the first chamber space 84a. Alternatively, a seal separate from the guide(s) 110 can be used to enclose the first chamber space 84a with respect to the shaft 100, and the guide(s) 110 could have any arrangement, e.g., permitting fluid flow, that supports the shaft 100 for movement relative to the valve body 60.

Figure 3:
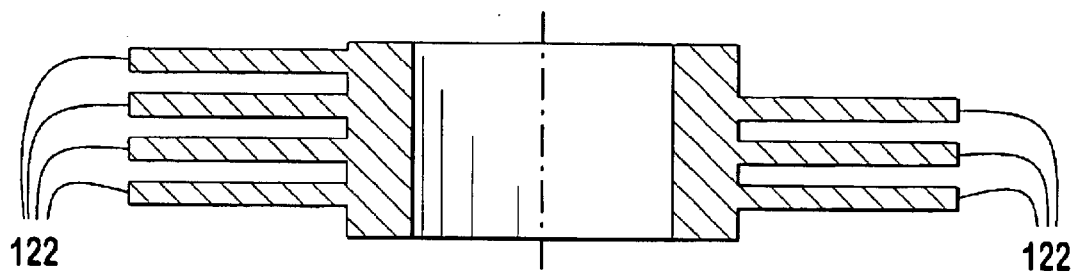
FIG. 3 is a cross sectional view of a detail of the pressure regulator shown in FIG. 2.
Figure 4:
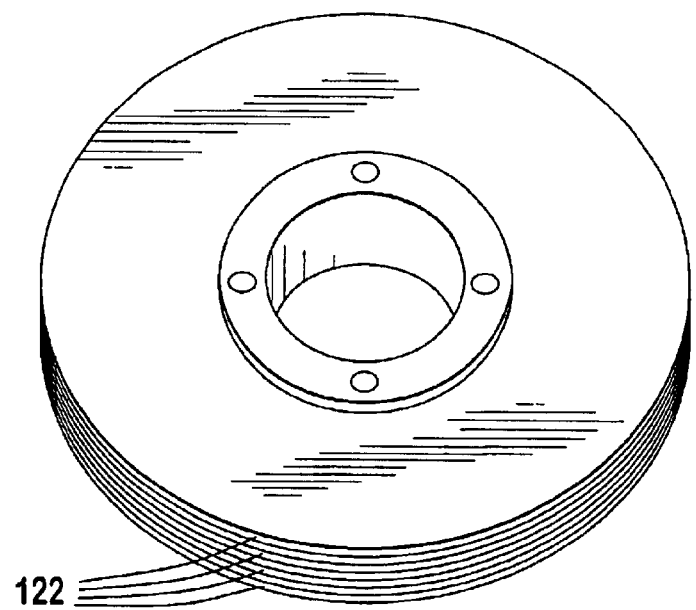
FIG. 4 is a perspective view of the detail of the pressure regulator shown in FIG. 3.

According to the preferred embodiment illustrated in FIGS. 2–4, the valve body 60 can be fastened to the actuator body 82 via an intermediate body 120. The intermediate body 120 can be separately fitted to the valve and actuator bodies 60, 82, or as shown in FIG. 2, can be integrally formed with either one of the valve and actuator bodies 60, 82. The intermediate body 120 can include one or more fins 122 (four are illustrated) projecting into the ambient conditions around the intermediate body 120. These fins 122 can be separately mounted on a cylindrical body 124 that is fitted to the intermediate body 120, or may be integrally formed with the intermediate body 120. The fins 122 can be in the shape of an annulus lying in an imaginary plane that is perpendicular to the longitudinal axis of the shaft, and have an inside diameter of the annulus fixed to the intermediate body 120 or to the cylindrical body 124. Of course, there can be any number, shape (e.g., not a complete annulus), or arrangement of the fin(s) 122 for dissipating into the ambient conditions heat that would otherwise be conducted from the valve body 60 to the actuator 80. Dissipating this heat can be beneficial in protecting the movable actuator wall 90, e.g., avoiding damage to the flexible diaphragm 92 that could otherwise be transferred from steam in the internal flow passage 62. The intermediate body 120 or fin(s) 122 can be constructed of metal, e.g., aluminum or magnesium, or an equivalent material suitable for dissipating heat to the ambient environment.

The operation of the system 10 will now be described. Steam is supplied from the steam source 30, via the first inlet 22, to the reformer 20, oxygen is supplied from the oxygen source 35, via the second inlet 24, to the reformer 20, and gasoline is supplied from the gasoline source 40, via the third inlet 28, to the reformer 20. The reformer 20 uses the steam, oxygen, and gasoline in a chemical reaction that generates hydrogen gas that is supplied, via the outlet 28, to the fuel cell 45. Other products of this chemical reaction, e.g., carbon dioxide or carbon monoxide, can be otherwise expelled from the reformer 20.

The pressure regulator 50 establishes a predetermined level of steam pressure at the first inlet 22. In particular, steam pressure from the steam source 30 is communicated by the signal passage 102 to the first chamber space 84a, and when the predetermined level of steam pressure is achieved, the movable actuator wall 90 is displaced against the opposing spring force of the coil spring 86. This displacement of the movable actuator wall 90 is conveyed via the shaft 100 to the valve 70, which is displaced from the valve seat 68 so as to provide fluid communication through the internal flow passage 62 and thereby vent steam pressure in excess of the predetermined level of steam pressure to the ambient environment through the outlet port 66.

Setting the predetermined level of steam pressure is achieved by adjusting the spring force of the coil spring 86. Increasing the spring force sets a higher predetermined level of steam pressure, and decreasing the spring force sets a lower predetermined level of steam pressure. The spring force can be adjusted by interchanging coil springs 86 having different spring rates, or by varying pre-compression of the coil spring 86 between the actuator body 82 and the movable actuator wall 90.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A method of dissipating heat from a steam pressure regulator, the steam pressure regulator including a valve body defining an internal flow passage between a first port and a second port, a valve movable between a first position substantially preventing fluid communication through the internal flow passage and a second position permitting generally unrestricted fluid communication through the internal flow passage, and an actuator including an actuator body defining a chamber, a movable actuator wall dividing the chamber into first and second chamber spaces, and a shaft coupling the movable actuator wall to the valve, the method comprising:

coupling an intermediate body between the valve body and the actuator body, the intermediate body being adapted for cooperative engagement with a fin arrangement;

engaging the fin arrangement with the intermediate body; and dissipating heat from the fin arrangement to the ambient conditions around the fin arrangement that would otherwise be conducted from the valve body to the actuator via the intermediate body.

2. A steam pressure regulator for a reformer of a fuel cell system, the reformer including an inlet in fluid communication with a steam source, and an outlet providing a supply of hydrogen gas, the steam pressure regulator comprising:

a valve body defining an internal flow passage between first and second ports, the first port is adapted to be in fluid communication with the inlet of the reformer;

a valve movable between first and second positions, the first position substantially preventing fluid communication through the internal flow passage, and the second position permitting generally unrestricted fluid communication through the internal flow passage;

an actuator including:
  an actuator body defining a chamber;
  a movable actuator wall dividing the chamber into first and second chamber spaces; and
  a shaft coupling the movable actuator wall to the valve; and an intermediate body coupling the valve body with respect to the actuator body, the intermediate body including a fin projecting into ambient conditions around the intermediate body.

3. The steam pressure regulator according to claim 2, wherein the fin dissipates into the ambient conditions heat that would otherwise be conducted from the valve body to the actuator.

4. The steam pressure regulator according to claim 1, wherein the intermediate body comprises a plurality of fins projecting into ambient conditions around the intermediate body.

5. The steam pressure regulator according to claim 2, wherein the intermediate body comprises a cylinder generally surrounding a longitudinal axis of the shaft, and the fin comprises an annulus lying in an orthogonal plane relative to the longitudinal axis.

6. The steam pressure regulator according to claim 5, wherein the annulus comprises an inside diameter and an outside diameter, and the inside diameter is fixed to the cylinder.

7. The steam pressure regulator according to claim 2, further comprising:

a resilient element disposed in the second chamber space, the resilient element urging the valve toward the first position.

8. The steam pressure regulator according to claim 7, wherein the resilient element comprises a spring contiguously engaging the movable actuator wall, the spring opposes displacement of the movable actuator wall due to an increase in fluid pressure in the first chamber space.

9. The steam pressure regulator according to claim 7, wherein the actuator body comprises a third port adapted to provide fluid communication between the second chamber space and the ambient conditions.

10. The steam pressure regulator according to claim 2, further comprising:

a guide supporting the shaft relative to the valve body.

11. The steam pressure regulator according to claim 10, wherein the guide comprises a bearing permitting relative sliding movement along a longitudinal axis of the shaft.

12. The steam pressure regulator according to claim 10, wherein the guide comprises a plurality of bearings permitting relative sliding movement along a longitudinal axis of the shaft.

13. The steam pressure regulator according to claim 2, further comprising:

a seat fixed with respect to the valve body, wherein the valve contiguously engages the seat in the first position.

14. The steam pressure regulator according to claim 2, wherein the first port is oriented at a 90 degree angle relative to the second port.

15. The steam pressure regulator according to claim 2, wherein the movable actuator wall comprises a first portion coupled to the shaft, a second portion sealed with respect to the actuator body, and an intermediate portion connecting the first and second portions, wherein flexibility of the intermediate portion permits relative movement between the first and second portions.

16. A steam pressure regulator for a reformer of a fuel cell system, the reformer including an inlet in fluid communication with a steam source, and an outlet providing a supply of hydrogen gas, the steam pressure regulator comprising:

a valve body defining an internal flow passage between first and second ports, the first port is adapted to be in fluid communication with the inlet of the reformer;

a valve movable between first and second positions, the first position substantially preventing fluid communication through the internal flow passage, and the second position permitting generally unrestricted fluid communication through the internal flow passage;

an actuator including:
  an actuator body defining a chamber;
  a movable actuator wall dividing the chamber into first and second chamber spaces; and
  a shaft coupling the movable actuator wall to the valve; and an intermediate body coupling the valve body with respect to the actuator body, the intermediate body including a fin projecting into ambient conditions around the intermediate body, wherein the shaft comprises a signal passage providing fluid communication between the first port and the first chamber space, wherein fluid pressure at the first port is communicated through the signal passage to the first chamber space.

* * * * *